Patented Jan. 19, 1943

2,308,854

UNITED STATES PATENT OFFICE 2,308,854

ABRASIVE ARTICLE

Carl E. Barnes, Cambridge, Mass., assignor to Norton Company, Worcester, Mass., a corporation of Massachusetts No Drawing. Application August 25, 1941, Serial No. 408,196. In Great Britain June 28, 1938

9 Claims. (Cl. 51—298)

This invention relates to abrasive articles and more particularly to articles made of abrasive grains bonded by a synthetic resin.

Methyl methacrylate in its monomeric form contains the polymerizable unsaturated group $CH_2=C—$, and it is considered to polymerize by a rearrangement of the primary valence bonds in such a way as to form linear chains having the group $CH_2—C—$ as the repeating unit. Methyl methacrylate in its polymerized form is a highly transparent, fusible and soluble resin having a refractive index of about 1.490, a tensile strength of 8,000 to 11,000 pounds per square inch, a softening point of 80° to 125° C. and a Rockwell hardness of 35 to 50, the variations in these characteristics depending on the procedure and the substances employed in polymerization. This monomeric ester may be polymerized in the presence of abrasive grains and an abrasive article formed thereby; but for some abrasive purposes the resin has undesired characteristics, such as being too soft or having too low a degree of hardness and too low a fusion point. The hardness of this linear chain type of polymer may however be improved by copolymerizing the substance with a polymerizable compound containing two of the unsaturated $CH_2=$ groups which are independently polymerizable. During polymerization, the growing chains incorporate the $CH_2$ groups of both substances and form an interpolymer having a three dimensional structure in which the linkages are established between the chains to an extent depending upon the amount of the cross linking agent used.

I have found that the acrylic, chloracrylic and methacrylic anhydrides, which contain two of the unsaturated $CH_2$ groups, form highly serviceable cross linking agents for methyl methacrylate and analogous esters, and the primary object of my invention is to provide abrasive articles made of such substances which will serve various useful purposes. Further objects will be apparent in the following disclosure.

In accordance with my invention, I propose to make abrasive articles, such as grinding wheels, sharpening stones, cutting-off wheels and honing, lapping and polishing devices, by bonding abrasive grains, such as crystalline alumina, silicon carbide, boron carbide, diamonds and other types of abrasive material, with resin substances formed of copolymers of the esters of acrylic acid, chloracrylic acid or methacrylic acid and the lower aliphatic alcohols having not over four carbon atoms, or mixtures of said esters, which are copolymerized with the anhydrides or mixed anhydrides of any of said acids or mixtures of said anhydrides, with or without other modifying substances. The hardness, strength, adhesion and other physical characteristics of the abrasive article are determined by the nature and the proportions of the bond ingredients and the method employed for making the article. The grinding wheel structure, as determined by the volume percentages of abrasive grains, bond and pores, is governed in part by the relative proportions of the bond and grains used. By varying the amount of the anhydride cross linking agent, the strength and other physical characteristics of the bond may vary from approximately those of the linear chain ester to those of the cross linking agent.

Some of the properties of the polymerized methacrylic acid esters are exemplified in the following table:

Polymers of methacrylic acid esters

| | Methyl | Ethyl | n-Propyl | n-Butyl | Iso-butyl |
|---|---|---|---|---|---|
| Hardness (Pfund) G at 25° C | 220 | 141 | 100 | 1 | 210 |
| Tensile strength, lbs./sq. in | 9000 | 5000 | 4000 | 1000 | 3400 |
| Impact strength (Dynstat), kg. cm./cm.² | 10.5 | 7.1 | 6.5 | 11.5 | 1.6 |

It has also been found that comparatively hard resins are formed of the methacrylic acid esters of those alcohols which are branched as much as possible, i. e. the methyl, ethyl, isopropyl and tertiary butyl alcohol esters of methacrylic acid, while much softer resins are formed of the remaining esters of less than a maximum branching, i. e. those of the normal propyl, normal primary butyl, normal secondary butyl and primary isobutyl alcohols. In general, the hardness and the thermal yield point decrease with the increase in molecular weight of the esterified alcohol. For example, methyl methacrylate softens above 100° C. while n-butyl methacrylate is soft and flexible at room temperature. However, the branching of the alcohol materially affects these various properties, as shown by the fact that isopropyl alcohol forms a methacrylate resin that is almost as hard as is polymerized methyl methacrylate. Also, the isobutyl ester is much harder and has a higher softening point and is less flexible than the straight chain butyl ester. The tensile strength of the straight chain ester falls off as the molecular weight of the alcohol increases. Hence, these various esters have widely varying properties. Likewise, the copolymers of the anhydrides with these esters of methacrylic acid, as well as acrylic and chloracrylic acids, have similarly variable characteristics. Therefore, by suitably selecting a given ester as a base substance and modifying it with a selected anhydride one may make abrasive bonds of widely varied properties.

These esters may be obtained from suitable commercial sources or manufactured in accordance with standard procedure. I prefer that the anhydrides be made by methods exemplified by the following method. 105 grams of methacryl chloride is slowly added to 208 grams of sodium methacrylate suspended in 200 cc. of dry ether. After standing for five or six hours, the sodium chloride is filtered off and the methacrylic anhydride thus produced is washed with dry ether. The ether solution is placed in a distilling flask and the ether is removed under reduced pressure, and the product distilled under vacuum. The distillate boiling between 75 and 85° C./5 mm. is collected. Pure methacrylic anhydride boils at 75° C./5 mm.

Acrylic anhydride may also be made by placing 70 grams of acrylic acid and 50 grams of acetic anhydride in a small still having a 75 mm. column, and 1.5 grams of paratoluene sulfonic acid and 1 gram of copper methacrylate are then added. The pressure is reduced to 30 mm. and distillation carried on. The fraction boiling at 82 to 82.5° C. is collected as acrylic anhydride, this amounting to 30 cc. The chlorine substituted acrylic anhydride may be made similarly by suitable modification of the reagents.

Each of the anhydrides thus formed polymerizes to a colorless brittle transparent resin having many small cracks, but when used as a cross linking agent in suitable proportions with the linear chain base substance or ester it will copolymerize therewith and produce a satisfactory bond.

A small amount of the cross linking agent will materially change the properties of the bond. The cross linking agent may be used in a large proportion so as to form a substantially infusible and insoluble body, or the amount may be so selected as to produce properties intermediate between those of the polymerized ester by itself and of the highly cross linked interpolymer. It is ordinarily desirable to limit the amount of cross linking agent so as to prevent there being sufficient strain set up in the interpolymer to cause crazing or cracking, and yet there should be enough cross linkages to produce a body of sufficiently high softening point or hardness characteristics to form a serviceable bond for the abrasive article. For example, as little as 0.5% by volume of acrylic, chloracylic or methacrylic anhydride will materially change the properties of methyl methacrylate and form a much harder body of greatly reduced solubility. The upper limit of the amount of the anhydride varies according to the ester selected. Ordinarily, I prefer to use not over 30 to 50% of the anhydride so that the properties of the bond are dominated by the ester; and for some esters, such as methyl methacrylate, a smaller proportion is advisable, if a strong and not too brittle article is desired.

A resin made wholly of methyl methacrylate is a flexible or resilient body, while resins containing appreciable amounts of the anhydrides tend toward the brittle side and to be much harder.

The resins made up of methyl methacrylate with very small amounts of the anhydride may be shaped by a molding operation, while a resin containing 2.5% or more of the anhydride may be shaped by either a grinding or a cutting machine. An abrasive article made from a mixture of abrasive grains and a bond containing more than 2.5% of methacrylic anhydride should ordinarily be made by having the bond polymerized in the presence of the abrasive grains, whereas those bodies containing a smaller amount of the anhydride may be formed by heat and pressure after polymerization has been partially or completely effected.

As an example of one type of resin suitable for a grinding wheel bond, I may copolymerize 93% of methyl methacrylate with 7% of methacrylic anhydride and thereby form a polymerized resin having a tensile strength at room temperature of 8000 to 10,000 pounds per square inch and at a temperature of 130° C. of 1000 pounds per square inch. The hardness on the Rockwell C scale, 60 kg. load, ⅛ inch ball, 15 seconds, is 60 to 62, while the impact strength ASTM Charpy, notched bar, is 0.54 foot pound. Its density at 30°/4° is 1.18. It has a water absorption of 0.67% and it is substantially unaffected or attacked by aqueous acids and dilute alkali solutions which might be met in connection with a grinding operation. This interpolymer is substantially infusible, but it may be softened at 130° C. It does not exhibit true plastic flow under heat and pressure but may be bent or deformed and shaped against a mold surface at 160° C. It is not softened by boiling water.

As further examples of bond substances, an interpolymer of methyl methacrylate polymerized with 20% by volume of monomeric methacrylic anhydride has a tensile strength of 2300 to 2500 pounds per square inch at 130° C. Other types of resins may be made by employing from 0.5% or less to about 50% by volume of the anhydride and the properties of the substance will vary accordingly. However, it is preferred to use not over about 30% of the anhydride in order that the bond may not be too brittle for ordinary abrasive uses.

Acrylic and chloracrylic anhydrides serve somewhat the same as does methacrylic anhydride, but they exhibit a slightly less hardening action and so serve for producing certain desired types of bond. The Rockwell hardness of the interpolymer varies with the amount of anhydride used. For example, a polymer of a mixture of 5% of acrylic anhydride with 95% of methyl methacrylate, when polymerized by heating for 48 hours at 65° C. and then hardened at 130° for 14 additional hours, was found to have a Rockwell hardness of 55. The use of 10, 15 and 20% of acrylic anhydride gave Rockwell hardnesses of 58, 59 and 60, respectively, and other properties of the resin were also varied by the change in proportions. The acrylic anhydride interpolymers with the base substances are likewise substantially infusible, but those with the lower content of the anhydride may be molded by heat and pressure. In general, they have about the same properties as those of the copolymers of methacrylic anhydride although they are slightly softer. Chloracrylic acid esters act similarly.

As a specific example covering the manufacture of an abrasive article, I may incorporate a desired amount of abrasive grains with a mixture of 90% of monomeric methyl methacrylate and 10% of monomeric methacrylic anhydride. This mixture is polymerized in the presence of the abrasive grains in a suitable mold, with or without the aid of a catalyst, such as benzoyl peroxide, and under suitable temperature conditions, such as at 60° C. for 24 hours. After removal from the mold, this hard body may then be subjected to a further heat treatment, such as 130° C. for 8 to 12 hours, which serves to harden the resin further and improve its bonding properties. This particular interpolymer has a Rockwell hardness of about 60.

Other methods of procedure, such as set forth in the Kistler and Barnes' application, Serial No. 228,004 filed September 1, 1938, of which I am one of the co-applicants, may be employed for producing suitable types of abrasive articles. In accordance therewith a porous abrasive article of controlled structure of abrasive, bond and pore volume may be made by forming a plastic mass of the bond substance and pressing a mixture of abrasive grains and the bond in suitable proportions to the desired shape and volume structure, after which the polymerization of the bond is completed to form a hard and integral body.

For example, methyl methacrylate or other chosen ester and methacrylic or other anhydride may be mixed in desired proportions, such as 90 parts of the ester and 10% of methacrylic anhydride, and this monomeric mass, together with 0.02% of benzoyl peroxide or other catalyzer, may be heated to 80° C. for about 1 hour to partially polymerize the monomer and form a viscous liquid. This viscous liquid is then mixed with the abrasive grains and the mass shaped as desired, after which polymerization is completed. A suitable bond for a grinding wheel may comprise 272 grams of methyl methacrylate and 100 parts of methacrylic anhydride. This mixture may be incorporated with the abrasive grains in suitable proportions depending upon the structure characteristics desired. The various ingredients are mixed together in a mixing kettle, such as one having rotating paddles, so as to stir the mass thoroughly and cause the bonding fluid to wet or coat the grains and form an intimate contact therewith and to have the abrasive grains substantially uniformly dispersed throughout the resinous bond. After the mixing operation has been completed, the mass may be shaped in a suitable mold, and preferably with pressure required to give the desired structure. The shaped mass is thereafter heated within or outside of the mold to complete the polymerization of the bond. This step may comprise heating the molded mass in an oven at 60° C., with or without the aid of light, for 24 hours to substantially complete the polymerization of the monomeric substance present; after which it may be given a further final baking treatment at 100° C. for a period of 5 hours or so. The temperature time conditions may be widely varied.

It will be appreciated that the porosity of the article as thus made will depend upon the relative proportions of the abrasive grains and the bond. If the bond is present in amount insufficient to fill the pore spaces, then the bond coated grains will lie substantially in contact, with the pore spaces therebetween determined by the size and the shapes of the abrasive grains. One may use the bonded grains in such proportions as to form a mass having large air spaces therein and which may be compressed to a smaller volume in accordance with the method set forth in the Howe and Martin Patent No. 1,983,082 and the volume structure of the article will be thereby fully determined. The percentage by weight of the bond in a grinding wheel may vary from 4 to 5% for a very soft wheel to 30% or more for a harder wheel, and for certain special wheels there may be as much as 50% of bond.

As a further method for making an article of required porosity or structure, one may employ a fully polymerized resin formed of the various ingredients herein set forth. For example, the mixture of monomeric substances may be copolymerized as a fine molding powder by adding the monomeric substances in required amount, together with a small amount of benzoyl peroxide, to a quantity of carbon tetrachloride or other solvent with which the liquid monomer is completely miscible and in which the polymer is not soluble. This mass may then be placed on a constant temperature bath maintained at 65° C. for about 5 hours. This causes the copolymer to precipitate as a fine powder, which may be filtered off and dried and stored for subsequent use. This dry molding powder may be softened or plasticized by means of a suitable agent which is capable of dissolving or otherwise plasticizing the bond and causing it to adhere firmly to the abrasive grains. The copolymer containing methyl methacrylate or other alkyl ester of said acids may be softened on the exposed surfaces of the resin particles by means of a solvent for the polymer, such as acrylic or methacrylic acid. This may be accomplished by mixing the liquid monomeric substance with the dry polymerized resin in a suitable mixing machine; or one may first wet or coat the abrasive grains with 5 or 10%, more or less, of the liquid monomer and thereafter mix in the dry polymeric powder and thus cause it to adhere to the grains as a coating thereon. The proportions of the two ingredients may be widely varied, since any excess of the monomeric liquid is ultimately converted to a hard substance by polymerization. It is desirable to use enough liquid solvent to insure that all of the resin particles are fully coated therewith and to insure that the polymerized powder adheres intimately to the abrasive. A slight amount of a catalyst, such as 0.02% of benzoyl peroxide, in the liquid monomeric substance will insure its complete polymerization. Many types of polymerizable substances may be used to serve as plasticizers for the dry molding powder, such as monomeric vinyl acetate or styrene, and these will be thereafter heat hardened by a polymerization process and aid in uniting the materials as an integral body. The plastic mass may be shaped in a mold and preferably under the pressure of several tons in a hydraulic press. Thereafter, the bond is subjected to heat, either within or outside of the mold, to complete any polymerization that is required. The final heating step may be at 160° C. or other suitable temperature. This heat and high pressure may cause the polymerized hard resin to soften and to adhere to the abrasive grains. Upon cooling, the mass solidifies and forms an integral structure. If the polymerized bond is so proportioned and constituted as to form a thermoplastic substance, it may be molded with abrasive grains under a high pressure of 1500 to 6000 pounds per square inch at 175° to 200° C. without the use of a plasticizing solvent.

It will be appreciated that I may employ one or more of the various esters with one or more of the cross linking agents. But, ordinarily the ester constitutes the major portion of the resin and the hardening agent is employed largely for the purpose of modifying the properties of the base substance and making it more suitable for use as a grinding wheel or other abrasive bond. I may also use with the copolymerized ester and the anhydride any further polymerizable or non-polymerizable modifying agent capable of imparting desired properties thereto, such as other resins or gums, waxes and the various organic solvents and plasticizing compounds which are employed with methyl methacrylate in the resin industry; and it is to be understood that such other substances may be incorporated in the bond without departing from the spirit and the scope of this invention, and that the claims are to be interpreted accordingly as not excluding the presence of such other substances. The above disclosure is, therefore, to be considered as illustrating the general principles of my invention and the preferred embodiments and compositions thereof and not as imposing limitations on the claims appended hereto.

This case is a continuation in part of my prior applications Serial Nos. 253,625, filed Jan. 30, 1939, and 326,974, filed March 30, 1940.

I claim:

1. An abrasive article comprising abrasive grains united by a bond composed primarily of a resin formed of copolymerized substances comprising the ester of an alkyl alcohol having not over four carbon atoms and an acid selected from the group consisting of acrylic, chloracrylic and methacrylic acids copolymerized with an anhydride of one of said acids.

2. An abrasive article comprising abrasive grains united by a bond composed primarily of a resin formed of copolymerized substances comprising the ester of an alkyl alcohol having not over four carbon atoms and an acid selected from the group consisting of acrylic, chloracrylic and methacrylic acids copolymerized with a compatible and miscible amount of an anhydride of one of said acids, said ester constituting the major portion of the mass and the bond being a substantially homogenous one phase substance.

3. An abrasive article comprising abrasive grains united by a bond composed primarily of a resin formed of copolymerized substances comprising the ester of an alkyl alcohol having not over four carbon atoms and an acid selected from the group consisting of acrylic, chloracrylic and methacrylic acids copolymerized in the presence of the abrasive grains with from 0.5 to 30% of an anhydride of one of said acids.

4. An abrasive article comprising abrasive grains bonded as a porous integral body by a lesser amount of a bond composed primarily of a resin formed of copolymerized substances comprising the ester of an alkyl alcohol having not over four carbon atoms and an acid selected from the group consisting of acrylic, chloracrylic and methacrylic acids copolymerized with a lesser, compatible and miscible amount of an anhydride of one of said acids.

5. An abrasive article comprising abrasive grains bonded primarily by a resin formed of copolymerized substances comprising the ester of an acid selected from the group consisting of the acrylic, chloracrylic and methacrylic acids and an alkyl alcohol having not over four carbon atoms per molecule and branched as much as possible which is interpolymerized with a lesser compatible and miscible amount of an anhydride of one of said acids.

6. An abrasive article comprising abrasive grains bonded primarily by a resin formed of copolymerized substances comprising the ester of an acid selected from the group consisting of the acrylic, chloracrylic and methacrylic acids and an alkyl alcohol having not over four carbon atoms per molecule and less than a maximum branching which is interpolymerized with a lesser compatible and miscible amount of an anhydride of one of said acids.

7. An abrasive article comprising abrasive grains bonded primarily by a resin formed of methyl methacrylate copolymerized with an anhydride of an acid selected from the group consisting of the acrylic, chloracrylic and methacrylic acids.

8. An abrasive article comprising abrasive grains bonded primarily by a resin formed of methyl methacrylate copolymerized with from 0.5 to 30% by weight of methacrylic anhydride.

9. An abrasive article comprising abrasive grains bonded primarily by a resin formed of methyl methacrylate copolymerized with from 0.5 to 30% by weight of acrylic anhydride.

CARL E. BARNES.